Oct. 29, 1935.  P. P. SOSINSKI  2,019,164

APPARATUS FOR CONTROLLING TRACKWAY DEVICES FROM A RAIL VEHICLE

Filed Feb. 23, 1933

INVENTOR
Paul P. Sosinski
BY
HIS ATTORNEY

Patented Oct. 29, 1935

2,019,164

UNITED STATES PATENT OFFICE 2,019,164

APPARATUS FOR CONTROLLING TRACKWAY DEVICES FROM A RAIL VEHICLE

Paul P. Sosinski, Edgewood, Pa., assignor to The Union Switch & Signal Company, Swissvale, Pa., a corporation of Pennsylvania Application February 23, 1933, Serial No. 657,961

10 Claims. (Cl. 246—128)

My invention relates to apparatus for controlling trackway devices from a rail vehicle, and more particularly, to apparatus for controlling such devices from a rail vehicle of the non-shunting type, such as a rubber tired rail car, and also for providing an indication on the car of the operation of said devices. One application of the apparatus embodying my invention, namely, the protection of grade crossings, is shown, by way of example, in the attached drawing, although it will be apparent that my invention is not limited to this use.

I will describe several forms of apparatus embodying my invention, and will then point out the novel features thereof in claims.

Figure 1:
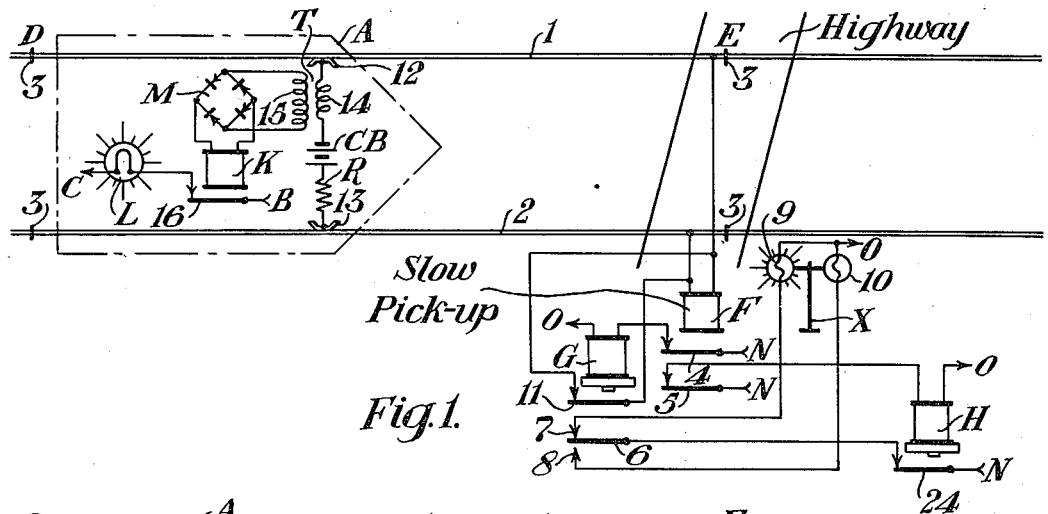
Figure 2:
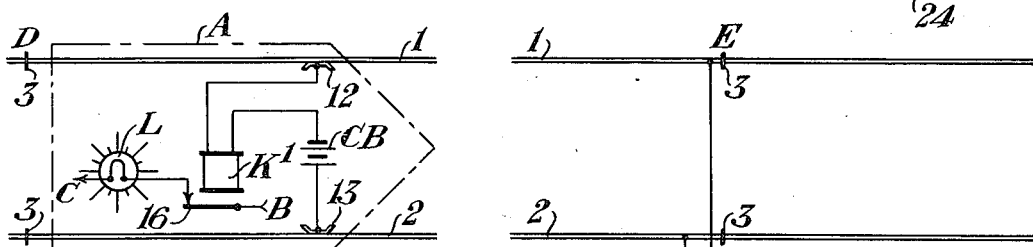
Figure 3:
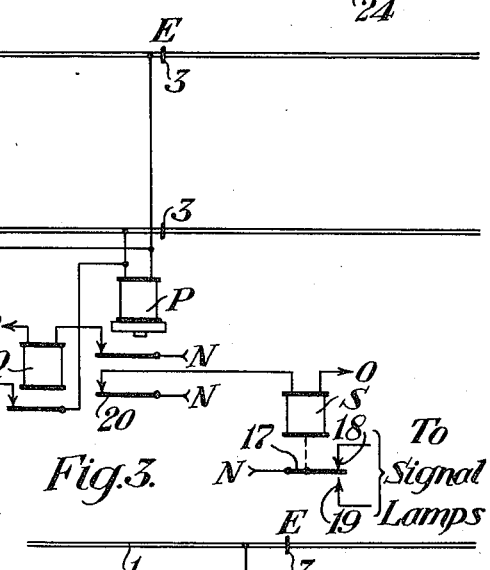
Figure 4:
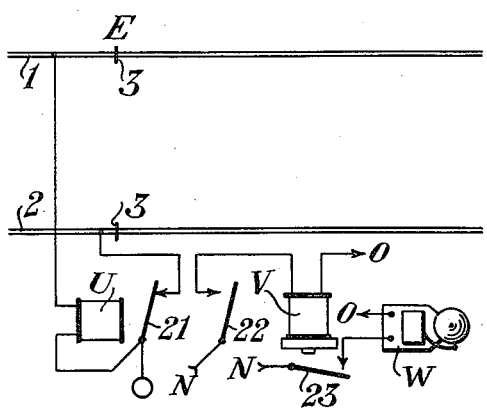
Figure 5:
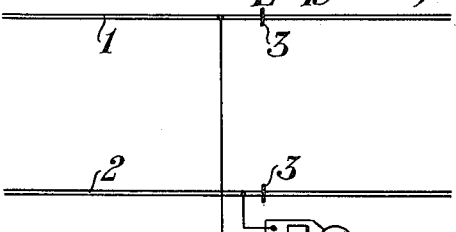

Fig. 1 of the accompanying drawing is a diagrammatic view showing one form of apparatus embodying my invention. Fig. 2 is a diagrammatic view showing a modified form of the car-carried portion of the apparatus illustrated in Fig. 1 and also embodying my invention. Figs. 3, 4 and 5 are modified forms of the wayside portion of the apparatus shown in Fig. 1 and likewise embodying my invention.

Similar reference characters refer to similar parts in each of the several views.

Referring to Fig. 1 of the drawing, the reference character A designates a rail car, having wheels which are incapable of completing a shunt path from one to the other rail of the track. Car A is arranged to carry the apparatus enclosed within the broken line representing the outline of the car. The rails 1 and 2 of the track section D—E are insulated from the rails of adjoining track sections by insulated rail joints 3. At location E is a grade crossing protected by the crossing signal X, which is controlled by the relay group F, G, H, relay F of this group being connected across the two rails of section D—E.

When relay F becomes energized, front contact 4 will close, to pick up the slow releasing relay G, and front contact 5 will also close, picking up the slow releasing relay H. As soon as relay G picks up, lamp control contact 6—7 will close, and contact 24 of relay H being closed, lamp 9 of signal X will become energized. At the same time, front contact 11 of relay G will also close, short-circuiting relay F and shunting the track, whereupon relay F will release, releasing relay G, thereby closing lamp control contact 6—8 to energize lamp 10 of signal X. This cycle of operation will continue to be repeated as long as power is supplied to the rails 1 and 2 for operating relay F.

Relay H is sufficiently slow releasing to bridge the open circuit interval of relay F, to insure that one or the other of lamps 9 or 10 will be lighted at all times, except when relay F becomes deenergized for a prolonged interval, which will occur when car A leaves section D—E. By properly proportioning the pickup and release time intervals of relays F and G, suitable timing of the flashes of lamps 9 and 10 can be obtained. The current for lamps 9 and 10, and relays G and H may be supplied from any suitable wayside source, not shown in the drawing, and having the terminals N—O.

On the car A is a source of current CB, illustrated as a battery, which impresses a potential across rails 1 and 2 by means of rail shoes 12 and 13, through the primary winding 14 of an indication transformer T, and through a current limiting impedance R. Relay F is designed to become picked up by the rail current flowing from battery CB. The impedance R prevents too great a drain on the battery should the car remain standing at location E.

When the car enters the signal starting section D—E, relay F will be picked up, as explained hereinbefore, and when front contact 11 of relay G becomes closed to shunt the track, an increase of current supplied from the battery through winding 14 of transformer T will result, followed by a decrease of current when relay G releases. The periodic increase and decrease of current in winding 14 will induce an alternating voltage in winding 15 for energizing indication relay K through the rectifier M. Relay K, in turn, will close a circuit for an indicating lamp L, over its front contact 16. If an alternating current indication relay is used the rectifier M can be eliminated.

If a steady indication is desired at lamp L, relay K should be of the slow releasing type and should bridge the operating cycle of relays F and G. If relay K is quick acting, a flashing indication of lamp L, in step with the operation of relay G and crossing lamps 9 and 10, may be had. Lamp L indicates to the car operator that relays F and G are operating and that the crossing is being protected. The steady indication of lamp L is as safe as the flashing indication since an accidental short circuit on the track will not maintain the indication relay K in its energized condition because a pulsating flux in winding 14 is essential for this result.

If the danger from accidental short circuits on the track is not considered important, and if alternating current is available on car A, the source CB may be alternating current, relay K being adjusted to pick up when the rails 1 and 2 are shunted by contact 11 of relay G, and to release when the shunt is removed. If it is desired to eliminate relay G, relay F may be provided with a suitable delayed-action contact for shunting the track. Due to the delay closing and delayed opening of this contact, following pick-up and release, respectively, of relay F, lamps 9 and 10 of signal X may be flashed alternately over suitable front and back contacts of relay F, without using relay G.

Referring to Fig. 2, the apparatus of this figure may be used to replace the car-carried apparatus of Fig. 1. By connecting indication relay K¹ in series with the battery CB, transformer T can be eliminated, the periodic increases in the battery current being utilized to provide periodic operation of relay K¹, in step with the operation of relay G. Relay K¹ should preferably be quick acting so that a flashing indication at lamp L will result, otherwise, if a steady indication is used, an accidental track shunt may result in a false indication of the operation of relays F and G. Since the winding of relay K¹ is in series with the battery, this winding may take the place of the current limiting impedance R.

If it is desired to decrease the effect of track voltage variation on the timing of the flashes of lamps 9 and 10, the arrangement shown in Fig. 3 may be used. In this figure, a constant speed flasher S, controlled by the slow releasing relay P which receives energy from car A in a manner similar to relay F in Fig. 1, is arranged to provide constant timing of lamps 9 and 10 over contacts 17—18 and 17—19, notwithstanding small variations in the duration of current pulses supplied by relay P over front contact 20. Contact finger 17 is biased to a normally open position so that both lamps 9 and 10 will be extinguished when the flasher S is not operating.

In Fig. 4, I have shown a pendulum type oscillating relay U which, in operation, maintains the slow releasing relay V energized, thus energizing the crossing bell W. The pulses of current in the winding of relay U will cause relay K of Fig. 1 or relay K¹ of Fig. 2 to respond, providing the desired indication. If the current pulses are insufficient for satisfactory indication, relay U can be provided with a front contact arranged to close shortly after contact 21 opens, this added contact acting to short-circuit the track, as in Fig. 1, to increase the current pulses.

Referring to Fig. 5, if the bell-starting section is relatively short and the crossing bell is of low power consumption, relays U and V of Fig. 4 can be eliminated and the bell W operated directly from the car battery, the pulsation of current in the bell winding providing the necessary flux variation in the indicating transformer T of Fig. 1.

From the foregoing description it will be apparent that I have provided a method for utilizing current from a source on a rail vehicle to provide control of a wayside device, as well as to provide an indication that the control is effective, by means of the same current, as modulated by the wayside device. It will be understood that the crossing protection devices shown in the drawing are merely illustrative, my invention being applicable to the control of any wayside device capable of responding to the rail current and capable, when controlled, of providing a change in this current which can be utilized for indication purposes.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination with a section of railway track and a rail vehicle the wheels of which are incapable of shunting the track, a source of current on said vehicle, means for applying a potential from said source across the two rails of said track, a wayside device controlled by rail current supplied from said source, means governed by said device in its controlled condition for periodically varying the current supplied from said source, and an indicator on the vehicle responsive to said periodically varied current for indicating the condition of said wayside device.

2. In combination with a section of railway track and a rail vehicle the wheels of which are incapable of shunting the track, a source of current on said vehicle, means for applying a potential from said source across the two rails of said track, a control relay connected across said two rails and capable of being picked up by rail current from said source, a contact governed by said relay in such manner as to become closed a short time interval after said relay is picked up, a circuit around the winding of said relay including said contact for causing a change in the magnitude of the current supplied from said source when said contact is closed, and an indicator on the vehicle responsive to said change in the magnitude of said current.

3. In combination with a section of railway track and a rail vehicle the wheels of which are incapable of shunting the track, a source of current on said vehicle, means for applying a potential from said source across the two rails of said track, a control relay connected across said two rails and capable of being picked up by rail current from said source, a contact governed by said relay in such manner as to close a short time interval after said relay is picked up and to open a short time interval after said relay is released, a circuit around the winding of said relay including said contact for causing said relay to release and the current from said source to increase when said contact is closed, and an indicator on the vehicle responsive to said current increase.

4. In combination with a section of railway track and a rail vehicle the wheels of which are incapable of shunting the track, a source of direct current on said vehicle, a pair of rail contacts for applying a potential from said source across the rails of said track, a transformer having its primary winding connected between one of said rail contacts and a terminal of said source, an indicator energized from the secondary winding of said transformer, a wayside device controlled by rail current supplied from said source, and means governed by said device in its controlled condition for periodically varying the current flowing from said source in the primary winding of said transformer to cause said indicator to become energized.

5. In combination with a section of railway track and a rail vehicle the wheels of which are incapable of shunting the track, a source of current on said vehicle, means for applying a potential from said source across the two rails of said track, a first relay connected with the rails of said track and arranged to be picked up by rail current from said source, a second relay energized over a front contact of said first relay, a shunt path around said first relay which becomes closed over a front contact of said second relay to release said first relay, a signal governed by said first relay, and an indicator on the vehicle responsive to a change in the magnitude of the current from said source occurring when said shunt path becomes closed.

6. In combination with a section of railway track and a rail vehicle the wheels of which are incapable of shunting the track, a source of current on said vehicle, a pair of rail contacts for applying a potential from said source across the rails of said track, a wayside device controlled by rail current supplied from said source, means governed by said device in its controlled condition for modifying the current supplied from said source, and an indicator connected between one of said rail contacts and said source and responsive to said modified current for indicating the condition of said device.

7. In combination with a section of railway track and a rail vehicle the wheels of which are incapable of shunting the track, a source of current on said vehicle, means for applying a potential from said source across the two rails of said track, a wayside device arranged to receive rail current supplied from said source, means controlled by said device for periodically interrupting the rail current received by said device whereby a periodic variation will result in the current supplied from said source, and an indicator on the vehicle responsive to said periodic current variation.

8. In combination with a section of railway track and a rail vehicle the wheels of which are incapable of shunting the track, a source of current on said vehicle, means for applying a potential from said source across the two rails of said track, a wayside device arranged to receive rail current supplied from said source, means governed by said device when receiving said current for periodically modifying the current supplied from said source, an indicator on the vehicle responsive to said modified current, a slow acting relay controlled by said device, and a signal controlled by said slow acting relay.

9. In combination with a section of railway track and a rail vehicle the wheels of which are incapable of shunting the track, a source of current on the vehicle, a wayside device, means for supplying rail current from said source to control said device, said device in its controlled condition acting to periodically vary said rail current, and an indicator on the vehicle responsive to said periodically varied current.

10. In combination with a section of railway track and a rail vehicle the wheels of which are incapable of shunting the track, a source of current on the vehicle, signaling apparatus in the wayside, means including said vehicle source for controlling said signaling apparatus over the rails of said track, said apparatus in its controlled condition acting to modulate the rail current supplied from said source, and an indicator on the vehicle responsive to said modulated current.

PAUL P. SOSINSKI.